US011935154B2

(12) United States Patent
Li et al.

(10) Patent No.: US 11,935,154 B2
(45) Date of Patent: Mar. 19, 2024

(54) IMAGE TRANSFORMATION INFRASTRUCTURE

(71) Applicant: Microsoft Technology Licensing, LLC, Redmond, WA (US)

(72) Inventors: Ji Li, San Jose, CA (US); Fatima Zohra Daha, Santa Clara, CA (US); Bei Liu, Beijing (CN); Huan Yang, Beijing (CN); Jianlong Fu, Beijing (CN)

(73) Assignee: Microsoft Technology Licensing, LLC, Redmond, WA (US)

(*) Notice: Subject to any disclaimer, the term of this patent is extended or adjusted under 35 U.S.C. 154(b) by 64 days.

(21) Appl. No.: 17/684,889

(22) Filed: Mar. 2, 2022

(65) Prior Publication Data

US 2023/0281884 A1 Sep. 7, 2023

(51) Int. Cl.
*G06T 7/00* (2017.01)
*G06F 3/0482* (2013.01)
*G06T 11/00* (2006.01)

(52) U.S. Cl.
CPC ............ *G06T 11/00* (2013.01); *G06F 3/0482* (2013.01); *G06T 7/0002* (2013.01);
(Continued)

(58) Field of Classification Search
CPC .................. G06T 11/00; G06T 7/0002; G06T 2200/24; G06T 2207/20081; G06T 2207/30168; G06F 3/0482
See application file for complete search history.

(56) References Cited

U.S. PATENT DOCUMENTS 10,740,939 B1* 8/2020 Chung .................. G06V 10/82
10,878,535 B2 12/2020 Yadav et al.
(Continued)

FOREIGN PATENT DOCUMENTS

EP 3528203 A1 8/2019
WO 2018075927 A1 4/2018
WO 2018194611 A1 10/2018

OTHER PUBLICATIONS

Masoudnia, et al., "Mixture of Experts: A Literature Survey", In Journal of the Artificial Intelligence Review, vol. 42, Issue 2, May 12, 2012, pp. 275-293.
(Continued)

*Primary Examiner* — Hien L Duong
(74) *Attorney, Agent, or Firm* — NovoTechIP International PLLC

(57) ABSTRACT

A method and system for transforming an input image via a plurality of image transformation stylizers includes receiving the input image; providing the input image, information about the plurality of image transformation stylizers and at least one of user data, history data, and contextual data to a trained machine-learning (ML) model for selecting a subset of the plurality of image transformation stylizers; receiving as an output from the ML model the subset of image transformation stylizers; executing the subset of the image transformation stylizers on the input image to generate a plurality of transformed output images; ranking the plurality of transformed output images based on at least one of the input image, the user data, the history data, and the contextual data; and providing the ranked plurality of transformed output images for display.

12 Claims, 12 Drawing Sheets

(52) U.S. Cl.
CPC ............... *G06T 2200/24* (2013.01); *G06T 2207/20081* (2013.01); *G06T 2207/30168* (2013.01)

(56) References Cited

U.S. PATENT DOCUMENTS

| | | | | |
|---|---|---|---|---|
| 11,393,100 | B2* | 7/2022 | Zhang | G06T 3/40 |
| 11,475,613 | B1* | 10/2022 | Tremblay | G06V 20/20 |
| 2016/0100101 | A1* | 4/2016 | Cohen | H04N 23/632 |
| | | | | 348/207.1 |
| 2016/0142649 | A1* | 5/2016 | Yim | H04N 1/00413 |
| | | | | 348/239 |
| 2016/0364625 | A1* | 12/2016 | Lin | G06T 7/60 |
| 2017/0140241 | A1* | 5/2017 | Maloney | G06T 7/11 |
| 2019/0238759 | A1* | 8/2019 | Ahn | G06T 5/00 |
| 2019/0251118 | A1* | 8/2019 | Ahn | G06T 5/50 |
| 2020/0134845 | A1* | 4/2020 | Wang | G06T 7/001 |
| 2020/0134874 | A1* | 4/2020 | Kim | G06V 10/82 |
| 2022/0301227 | A1* | 9/2022 | Kanazawa | G06T 11/001 |
| 2022/0375024 | A1* | 11/2022 | Luo | G06T 3/0012 |
| 2023/0124252 | A1* | 4/2023 | Liu | G06T 11/00 |
| | | | | 345/589 |

OTHER PUBLICATIONS

"Invitation to Pay Additional Fee Issued in PCT Application No. PCT/US22/052485", dated Apr. 18, 2023, 11 Pages.

"International Search Report and Written Opinion Issued in PCT Application No. PCT/US22/052485", dated Jun. 12, 2023, 18 Pages.

* cited by examiner

IMAGE TRANSFORMATION INFRASTRUCTURE

BACKGROUND

In recent years, use of digital images in many areas of work and personal life has significantly increased. Many users utilize digital images to create documents and work products, participate in social media, and/or memorialize their experiences. For example, digital images are sometimes provided as visual assets to enable users to create presentations, multimedia materials, and the like. Acquiring images to provide as visual assets, however, is an expensive and time-consuming task. Moreover, the images that are available in a visual asset library may not fit well with a user's document. To improve the quality, change the look of, and/or provide variations of digital images, an image transformation stylizer can be used. An image transformation stylizer often enables users to quickly transform an input image to a revised version. Developing and maintaining image transformation stylizers, however, is a time-consuming and expensive process.

Furthermore, when multiple image transformation stylizers are available, it is often difficult for users to decide which one to apply to their image. Some applications apply multiple image transformation stylizers to an input image to provide a preview of the changes to a user, thus enabling the user to make an informed decision. However, executing a large number of image transformation stylizers requires a significant amount of processing, memory and/or bandwidth resources.

Hence, there is a need for improved systems and methods of creating, maintaining and/or selecting image transformation stylizers.

SUMMARY

In one general aspect, the instant disclosure describes a data processing system having a processor and a memory in communication with the processor wherein the memory stores executable instructions that, when executed by the processor, cause the data processing system to perform multiple functions. The functions may include receiving an input image for transformation by a plurality of image transformation stylizers, providing the input image, information about the plurality of image transformation stylizers and at least one of user data, history data, and contextual data to a trained machine-learning (ML) model for selecting a subset of the plurality of image transformation stylizers based on at least on one of the input image, the information about the plurality of image transformation stylizers, the user data, the history data, and the contextual data, receiving as an output from the ML model the subset of image transformation stylizers, executing the subset of the image transformation stylizers on the input image to generate a plurality of transformed output images, ranking the plurality of transformed output images based on at least one of the input image, the user data, the history data, and the contextual data, and providing the ranked plurality of transformed output images for display.

In yet another general aspect, the instant disclosure describes a method for transforming an input image via a plurality of image transformation stylizers. The method may include receiving the input image for transformation by the plurality of image transformation stylizers, providing the input image, information about the plurality of image transformation stylizers and at least one of user data, history data, and contextual data to a trained ML model for selecting a subset of the plurality of image transformation stylizers based on at least on one of the input image, the information about the plurality of image transformation stylizers, the user data, the history data, and the contextual data, receiving as an output from the ML model the subset of image transformation stylizers, executing the subset of the image transformation stylizers on the input image to generate a plurality of transformed output images, ranking the plurality of transformed output images based on at least one of the input image, the user data, the history data, and the contextual data, and providing the ranked plurality of transformed output images for display.

In a further general aspect, the instant disclosure describes a method for releasing and maintaining an image transformation stylizer. The method may include receiving the image transformation stylizer for release, retrieving a plurality of domain sensitive input images, applying the image transformation stylizer to the plurality of domain sensitive input images to generate a plurality of transformed output images, receiving evaluation data related to the transformed output images, determining based on the evaluation data that the image transformation stylizer is approved for release, releasing the image transformation stylizer for use by an image transformation engine, collecting data relating to use of the image transformation stylizer, determining, based on the collected data, that the image transformation stylizer should be retired, and removing the image transformation stylizer from use by the image transformation engine.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1A:
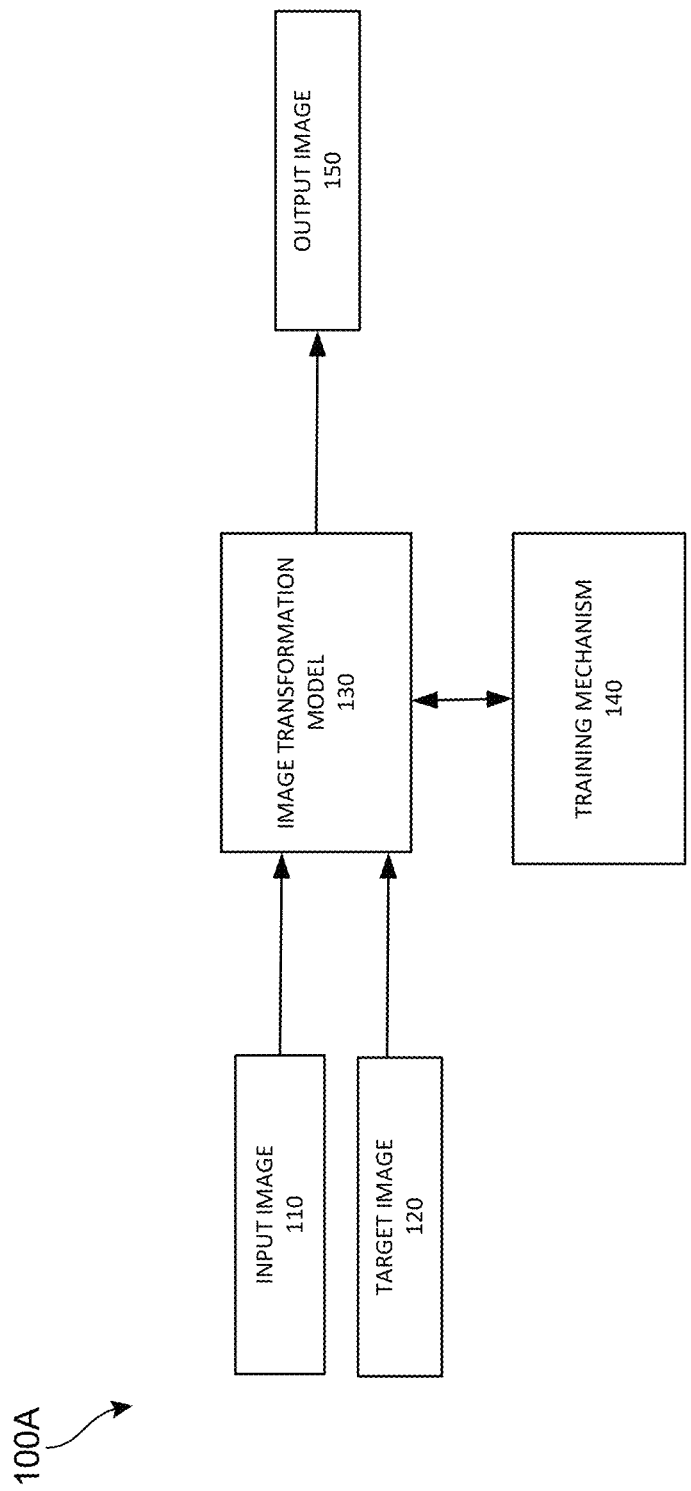
FIGS. 1A-1B depict example image transformation models upon which aspects of this disclosure may be implemented.

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

Many computer applications provide a variety of digital images for users to utilize in their documents and designs. Acquiring digital images to provide a large library of visual assets, however, is an expensive and time-consuming process. Moreover, the images that are available may not fit well with the document or design the user is creating. For example, the color hue of the image may not match well with the design being created. One way in which more variation of digital images may be provided is to use image transformation mechanisms that generate various forms of the same image. Generating different image transformation stylizers, however, is itself an expensive and labor-intensive process, as these image transformation stylizers are often based on algorithms developed by designers and/or engineers. Thus, exists a technical problem of lack of automated mechanisms for generating image transformation stylizers.

To address this technical problem, this description provides a technical solution for utilizing ML models to automatically generate a plurality of image transformation stylizers. While such ML models increase efficiency and reduce costs in generating image transformation stylizers, an image transformation stylizer generated by ML model may not be ready or appropriate for use by the general public. For example, some automatically generated image transformation stylizers may result in transforming images in offensive or inappropriate manners. Other automatically generated image transformation stylizers may result in poor quality images. Furthermore, while many different image transformation stylizers may become available for use, some may not be useful or popular with users. Leaving such image transformation stylizers in the library of image transformation stylizers may take up unnecessary storage space. Furthermore, having too many image transformation stylizers, particularly ones that are not used very often, may result in user confusion and dissatisfaction. Thus, there exists another technical problem of lack of proper infrastructure for production, release and maintenance of image transformation stylizers.

Furthermore, while the technical solutions presented in this disclosure enable generation of more image transformation stylizers, not all of the available image transformation stylizers may be appropriate or relevant to every user. Displaying all of the image transformation stylizers for selection may simply result in confusion and cognitive overload. Furthermore, executing a large number of image transformation stylizers on an input to provide previews to the user requires extensive memory, processing and bandwidth resources. Still further, displaying a large number of image previews may result in constraints on screen space. Moreover, current applications that provide users with image transformation stylizers often provide the available image transformation stylizers in the same order. This often results in overuse of the first few image transformation stylizers, while the remaining image transformation stylizers are not used very often. This is partially the case when there are a large number of image transformation stylizers to choose from. Thus, there exits another technical problem of lack mechanisms for making an appropriate and efficient selection among the set of available image transformation stylizers. This technical problem often leads to technical problems of excessive use of memory, processing and bandwidth resources, and constraining screen space.

To address these technical problems and more, in an example, this description provides a technical solution used for automatically generating image transformation stylizers by utilizing ML model. The technical solutions also provide an improved infrastructure for generation, production and maintenance of image transformation stylizers. The improved infrastructure includes multiple quality control stages, at least one of which involves evaluating the image transformation stylizer to ensure it complies with legal, ethical and/or cultural standards. The infrastructure may also involve dynamically maintaining and optimizing image transformation stylizers.

Furthermore, the technical solutions provided herein provide an improved image transformation pipeline that more effectively utilizes a set of selectable image transformation models in order to generate transformed variants of images that results in an improved user experience. This may be achieved by utilizing ML models that take user history, contextual data, image characteristics, user location, user language, intended use and/or other parameters into account to choose image transformation stylizers that are mostly likely to be useful to the user. In some implementations, this involves use of a gating model that receives as input, an input image, user history data, intended use, contextual data, and/or other parameters and selects a limited number from among a plurality of available image transformation stylizers. The selected image transformation stylizers are then provided to a ranking model that receives as input user history data, intended use and/or other parameters to rank the image transformation stylizers based on their likelihood of being relevant to the user and the input image. The ranking may then be used when displaying a collection of desirable transformed image variants to the user. In some implementations, a user experience enabled by the pipeline is provided for viewing the collection of desirable transformed image variants along with a suggestion feature to recommend stylizers for transformations based on the user's current document or design. As a result, the technical solutions provide an improved image transformation infrastructure for generating transformed images.

The technical solution described herein addresses the technical problems of expensive and inadequate image variants and expensive and difficult to generate image transformation stylizers by utilizing ML models that automatically generate multiple image transformation stylizers. Moreover, the technical solution addresses the technical problem of inappropriate for use or obsolete image transformation stylizers by providing an image transformation stylizer infrastructure that includes quality control, production, release and maintenance of image transformation stylizers. Furthermore, the technical solution addresses the technical problem of numerous image transformation stylizers utilizing excessive memory, processing, and bandwidth resources, and constraining screen space by providing an image transformation infrastructure that utilizes image transformation stylizers that are likely to be relevant and/or useful to the user. The technical solutions achieve the technical effects by providing a system and method for automatically generating image transformation stylizers, monitoring newly generated image transformation stylizers for quality and ethical considerations before production, monitors image transformation stylizers that are in use for usability, and effectively selects a set of image transformation stylizers from among the plurality of available image transformation stylizers to apply to an input image. The technical solution allows a viewer to quickly navigate and efficiently access a preview of transformed variants of the input image that are most likely to be useful to the user. The technical effects at least include (1) improving the efficiency of generating and maintaining a library of image transformation stylizers; (2) improving the efficiency and lowering the cost of generating a library of visual assets; (3) improving the process of producing new image transformation stylizers; (4) reducing the processing, memory and bandwidth requirements for executing image transformation stylizers on an input image to generate previews of transformed variants for the user's viewing; (5) increasing relevancy of the image transformation stylizers to the user and/or input image; (6) improving the viewer's navigation speed and their ability to quickly select a relevant image transformation stylizer thus significantly improving the user's experience. The benefits provided by these technology-based solutions yield more user-friendly applications, reduced costs in generating visual assets and image transformation stylizers and increased computer system and user efficiency.

The following terminology is used in the description. A "image transformation stylizers," is used herein to refer to an image filter or other image stylizer that can be used to transform a digital image to a revised variant of the same digital image. In some implementations, an image transformation stylizer is an image transformation ML model. The term "document" as used herein refers to a presentation slide, graphical design template, word processing document, digital drawing document or any other electronic document in which a digital image can be used.

FIG. 1A depicts an example image transformation model used in an example computer environment upon which aspects of this disclosure may be implemented. The computing environment 100A may include the image transformation model 130 and a training mechanism 140. The image transformation model may be an ML model trained by the training mechanism 140 to receive as input an input image 110 and generate as output a transformed variant of the input image as the output image 150.

The training mechanism 140 may use training data sets stored in a training data store to provide initial and ongoing training for each of the models. The training data sets may include pairs of input image 110 and target image 120. The target image 120 may be a transformed variant of the input image 110. The transformed variant may be generated by a human (e.g., graphic designer). The initial training may be performed in an offline stage. Additionally, and/or alternatively, the one or more ML models may be trained using batch learning. By providing the transformed variant of the input image 110, the training mechanism 140 may train the image transformation model 130 to transform future images using the same changed parameters as those of the target image 120. This can result in quick and inexpensive production of many desired image transformation models that can receive an input image 110 and generate an output image 150.

As a general matter, the methods and systems described herein may include, or otherwise make use of one or more ML model to perform image transformation, monitor usability of image transformation models, detect patterns in user data, images, and/or contextual data to determine likelihood of relevance of image transformation models to users and/or input images. ML generally involves various algorithms that can automatically learn over time. The foundation of these algorithms is generally built on mathematics and statistics that can be employed to predict events, classify entities, diagnose problems, and model function approximations. As an example, a system can be trained using data generated by a ML model in order to identify patterns in user activities, determine associations between various images and users, and identify desired image characteristics. Such training may be made following the accumulation, review, and/or analysis of data over time. Such data is configured to provide the ML algorithm (MLA) with an initial or ongoing training set. In addition, in some implementations, a user device can be configured to transmit data captured locally during use of relevant application(s) to a local or remote ML algorithm and provide supplemental training data that can serve to fine-tune or increase the effectiveness of the MLA. The supplemental data can also be used to improve the training set for future application versions or updates to the current application.

In different implementations, a training system may be used that includes an initial ML model (which may be referred to as an "ML model trainer") configured to generate a subsequent trained ML model from training data obtained from a training data repository or from device-generated data. The generation of both the initial and subsequent trained ML model may be referred to as "training" or "learning." The training system may include and/or have access to substantial computation resources for training, such as a cloud, including many computer server systems adapted for machine learning training. In some implementations, the ML model trainer is configured to automatically generate multiple different ML models from the same or similar training data for comparison. For example, different underlying MLAs, such as, but not limited to, decision trees, random decision forests, neural networks, deep learning (for example, convolutional neural networks), support vector machines, regression (for example, support vector regression, Bayesian linear regression, or Gaussian process regression) may be trained. As another example, size or complexity of a model may be varied between different ML models, such as a maximum depth for decision trees, or a number and/or size of hidden layers in a convolutional neural network. Moreover, different training approaches may be used for training different ML models, such as, but not limited to, selection of training, validation, and test sets of training data, ordering and/or weighting of training data items, or numbers of training iterations. One or more of the resulting multiple trained ML models may be selected based on factors such as, but not limited to, accuracy, computational efficiency, and/or power efficiency. In some implementations, a single trained ML model may be produced.

The training data may be occasionally updated, and one or more of the ML models used by the system can be revised or regenerated to reflect the updates to the training data. Over time, the training system (whether stored remotely, locally, or both) can be configured to receive and accumulate more training data items, thereby increasing the amount and variety of training data available for ML model training, resulting in increased accuracy, effectiveness, and robustness of trained ML models.

In collecting, storing, using and/or displaying any user data used in training ML models, care may be taken to comply with privacy guidelines and regulations. For example, options may be provided to seek consent (e.g., opt-in) from users for collection and use of user data, to enable users to opt-out of data collection, and/or to allow users to view and/or correct collected data.

Figure 1B:
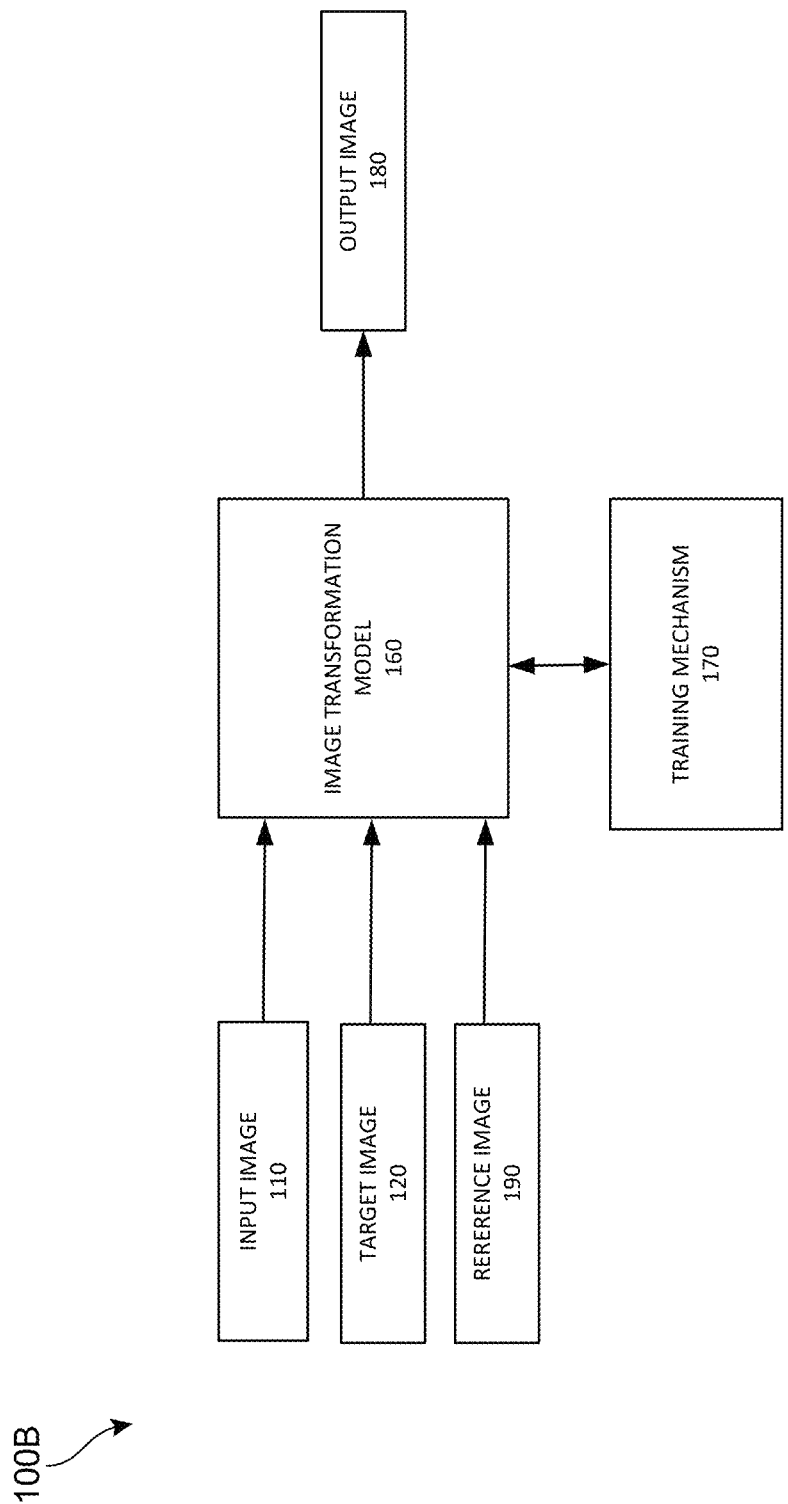

FIG. 1B depicts another example image transformation model used in an example computer environment 100B upon which aspects of this disclosure may be implemented. The computing environment 100B may include an image transformation model 160 and a training mechanism 170. The image transformation model may be a ML model trained by the training mechanism 170 to receive as input an input image 110 and a reference image 190 and generate as output a transformed variant of the input image as the output image 180. The reference image 190 may be used as a source for transforming the input image. In an example, this may involve detecting characteristics such as color and texture of the reference image 190 and transforming the input image 110 in accordance with the detected characteristics.

The training mechanism 170 may use training data sets stored in a training data store to provide initial and ongoing training for each of the models. The training data sets may include sets of input image 110, target image 120 and reference image 190. The target image 120 may be a transformed variant of the input image 110 which has been transformed to imitate image characteristics of the reference image 190. In an example, the transformed variant is generated by a human (e.g., graphic designer). The initial training may be performed in an offline stage. Additionally, and/or alternatively, the ML models may be trained using batch learning.

In some implementations, the image transformation model 160 is a Generative Adversarial Network (GAN) model that has two branches. One branch of the model may calculate texture characteristics of the reference image, while the other branch calculates the color characteristics of the reference image. Each of the branches may then apply the calculated characteristics to the input image 110. The resulting output image 180 may have a changed color space from the input image 110 that captures some of the color space of the reference image 190. In some implementations, additional parameters are provided as input to the image transformation model 160. These parameters may include texture parameters and parameters that determine how closely the input image should emulate the reference image. The input parameters may be predetermined and provided by an administrator based on quality testing and/or other variables. In this manner, a number of image transformation models that can receive an input image 110 and change the input image 110 to look like a reference image.

Figure 2:
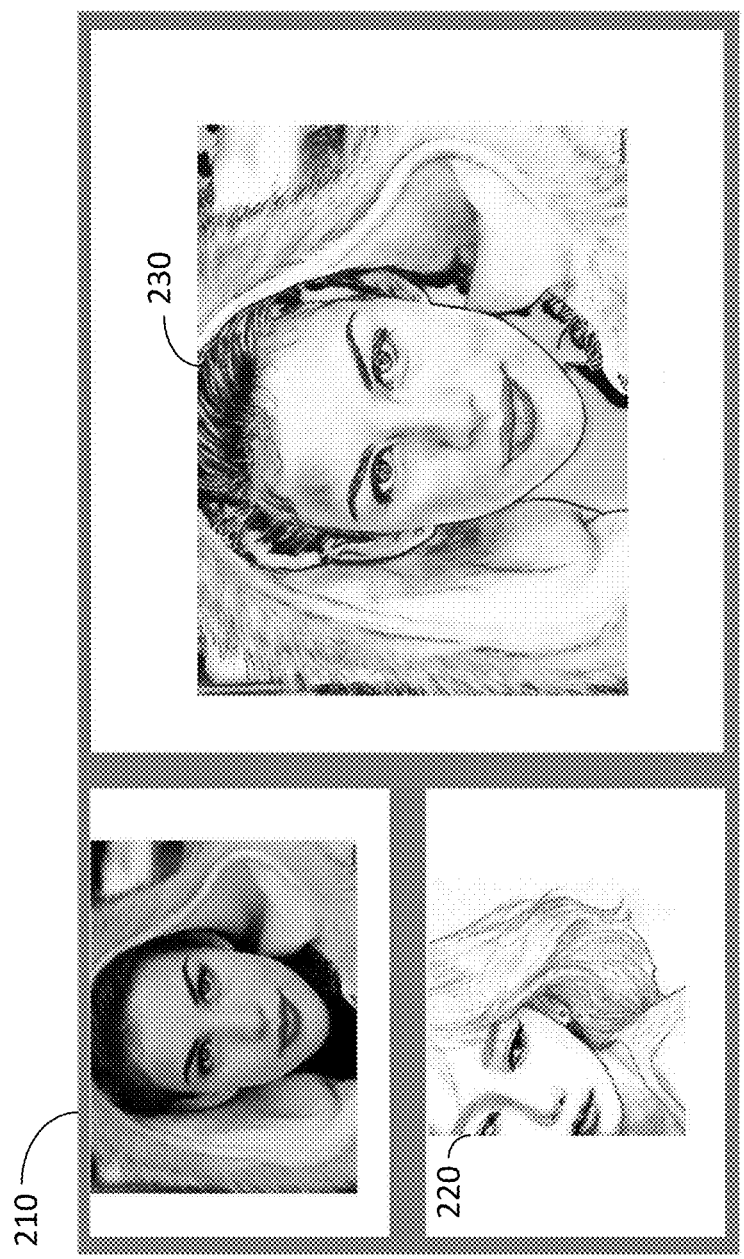
FIG. 2 depicts an example of input and reference images used to generate an example output image by using an image transformation model

FIG. 2 depicts an example of input and reference images used to generate an example output image by using an image transformation model such as the image transformation model 160. As depicted, the reference image 220 may be used as a reference to change the color, texture and/or other characteristics of the input image 210. As a result, the output image 230 is similar in color and texture to the reference image 220. For example, while the input image was in color, the output image 230 is in black and different shades of gray to closely resemble the color space of the reference image.

Figure 3:
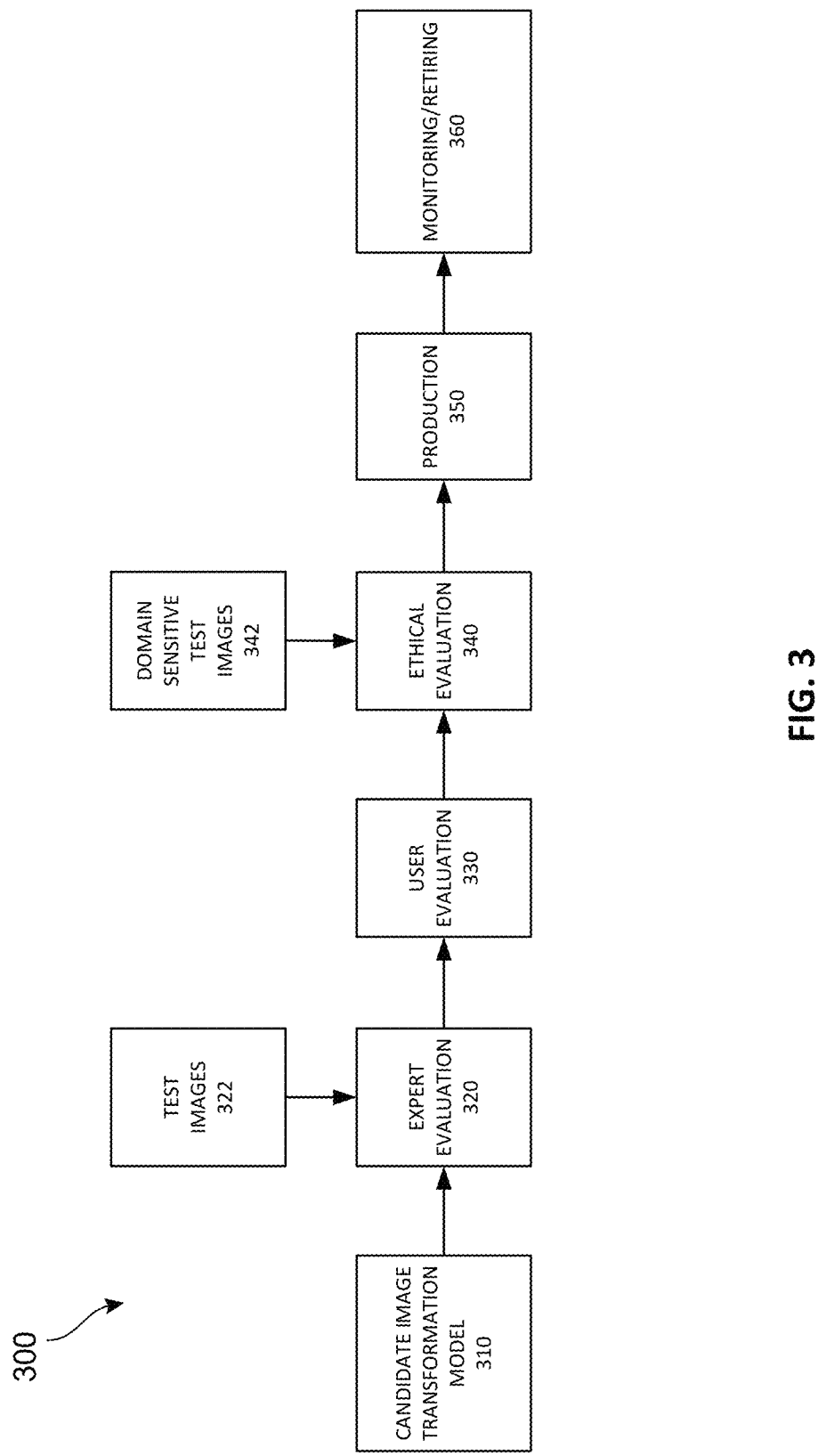
FIG. 3 depicts an example image transformation production and maintenance infrastructure.

FIG. 3 depicts an example image transformation production and maintenance infrastructure 300. The transformation production and maintenance infrastructure 300 may include multiple elements that perform various functions. In an example, the transformation production and maintenance infrastructure 300 includes an expert evaluation stage 320, user evaluation stage 330, ethical evaluation stage 340, production stage 350 and monitoring/retiring stage 360. When a candidate image transformation model 310 has been trained and is ready for testing an evaluation, it may undergo expert evaluation 320. This may involve review and testing for quality control issues. For example, engineers, designers and/or other experts may provide test images 322 as inputs to the candidate image transformation model 310 and evaluate the outputs generated by the candidate image transformation model 310 for quality and consistency. Moreover, during the expert evaluation stage 320 the functionality, speed, and/or other operational parameters of the candidate image transformation model 310 may be tested and evaluated to ensure the candidate image transformation model 310 is ready for release.

Once expert evaluation has been completed, the candidate image transformation model 310 may undergo user evaluation 330. This may involve releasing the candidate image transformation model 310 to a limited group of users (e.g., ML model testers, internal users, etc.) for use in practice. Feedback regarding the candidate image transformation model 310 may then be acquired from the group of users to determine its usability and functionality and obtain an overall view of whether the candidate image transformation model 310 will be desirable for end users. In addition to expert and user evaluations, the candidate image transformation model 310 may undergo ethical evaluation 340. This may involve providing domain sensitive test images 342 as inputs to the candidate image transformation model 310 and evaluating the outputs to ensure there are no ethical, legal, cultural or other implications that affect the use of the candidate image transformation model 310. This is because automatically generated image transformation models may lead to transformed variants that are offensive, biased or otherwise inappropriate. To ensure the candidate image transformation model 310 complies with the required standards, domain sensitive test images 342 may provide images that include various categories of human images, political topics, or other sensitive topics. The transformed variants of these images may then be reviewed by experts (e.g., individuals who are trained in identifying ethical, legal, cultural or other types of issues) to determine if they cause any issues.

Once the candidate image transformation model 310 is evaluated and approved during the expert evaluation 320, user evaluation 330 and ethical evaluation 340 stages, it may go to the production stage 350. The production stage 350 may involve storing the candidate image transformation model 310 in a data store containing a library of image transformation stylizers that are available for use in one or more applications. This may also involve adding the name and/or other information about the candidate image transformation model 310 to a list of available image transformation stylizers. After an image transformation model enters production and use, a monitoring/retiring stage 360 may continuously monitor its use to determine its usability and/or popularity. That is because while a candidate image transformation model 310 may be appropriate for release, it may not be useful to many users. To ensure image transformation models that are not used often do not take up unnecessary memory and processing resources, the monitoring/retiring stage 360 may keep track of the number of times each image transformation model is used by users over a period of time.

When it is determined that the use of an image transformation model is below a predetermined threshold, the image transformation model may be retired. This may involve removing the image transformation models from the library of available image transformation models. This process ensures that only image transformation models that are actually used by users are kept in use. As a result, new image transformation models that may be more useful to users can be added without increasing memory and processing loads. This increases user satisfaction, while improving the functionality and use of the computer systems used to process and store image transformation models.

Figure 4A:
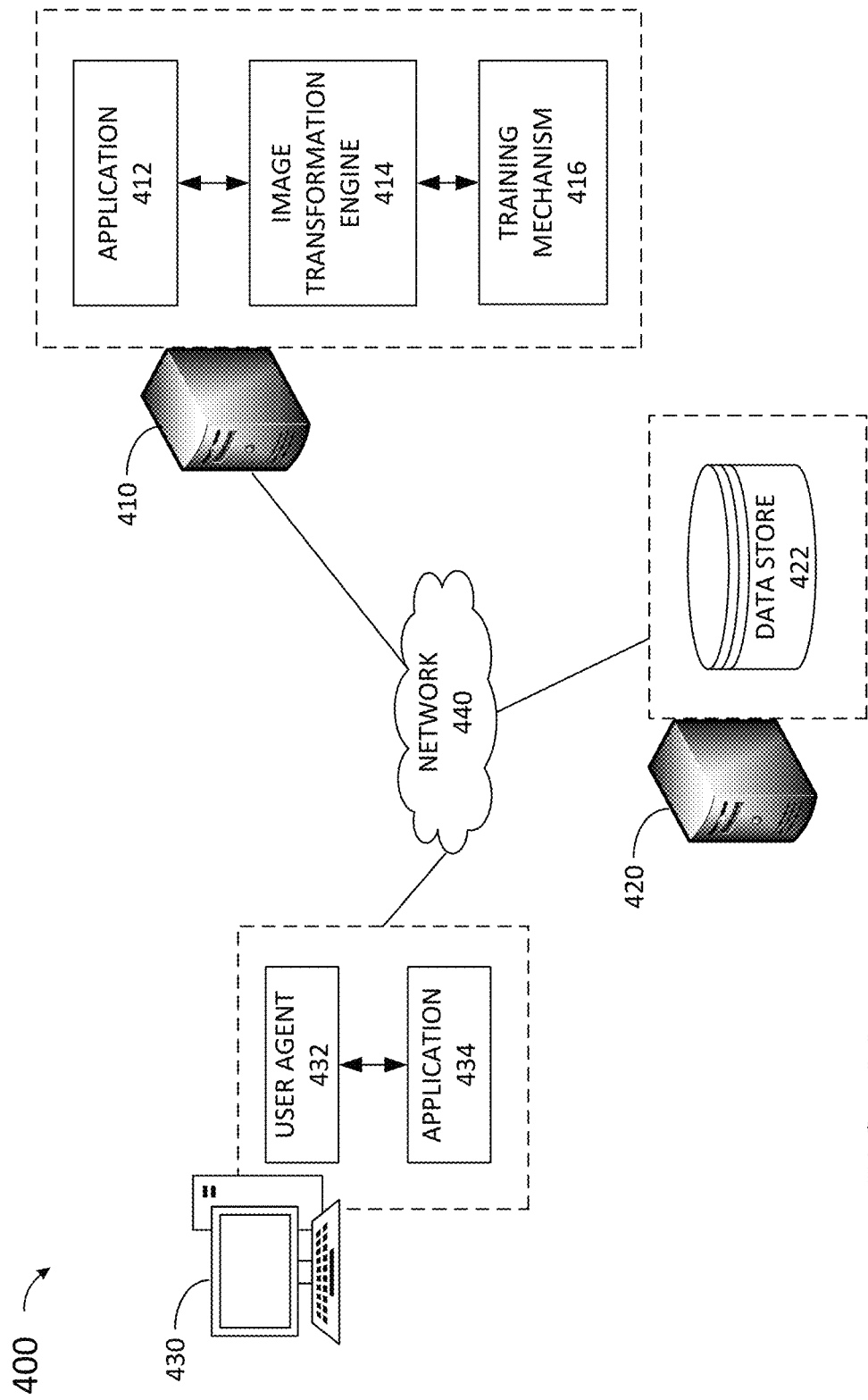
FIGS. 4A-4B illustrates an example system, upon which aspects of this disclosure may be implemented.

FIG. 4A illustrates an example system 400, upon which aspects of this disclosure may be implemented. The system 400 may include a server 410, which may itself include an application 412, an image transformation engine 414 and a training mechanism 416. While shown as one server, the server 410 may represent a plurality of servers that work together to deliver the functions and services provided by each engine or application included in the server 410. The server 410 may operate as a shared resource server located at an enterprise accessible by various computer client devices such as a client device 430. The server 410 may also operate as a cloud-based server for offering meeting agent services in one or more applications such as application 412 and/or application 434.

The server 410 may include and/or execute an image transformation engine 414, which may receive a request for transforming an input from an application such as the application 412 or 434 and may process the request by retrieving various types of the image, user, applications 412/434 and/or other contextual data. The data may include user history data, data relating to characteristics of the input image, the intended use of the input image, the type of application used for working with the image, the type of device on which the image is viewed, the geographical location or language of the user and user preferences associated with those user population segments, and the like. The image transformation engine 414 may provide the retrieved information to one or more ML models for analyzing for analyzing the available image transformation stylizers and identifying those that are more likely to be relevant and/or useful to the user for transforming the input image. The request to transform the input image may be transmitted to the image transformation engine 414 from the applications 412/434, when a user submits a request to edit an image or the applications 412/434 identify a need to provide alternative variations of an image used in an open document.

The image transformation engine 414 may include separate modules for eliminating image transformation stylizers that are not likely to be useful for an input image and ranking the remaining image transformation stylizers. One or more modules and elements of the image transformation engine 414 may include one or more ML models. The internal structure of and data flow between the various elements of the image transformation engine 414 are discussed in greater detail with respect to FIG. 4B.

One or more ML models implemented by the image transformation engine 414 may be trained by the training mechanism 416. The training mechanism 416 may use training data sets stored in the data store 422 to provide initial and ongoing training for each of the models. Alternatively, or additionally, the training mechanism 416 may use training data sets from elsewhere. In some implementations, the training mechanism 416 uses labeled training data to train one or more of the models via deep neural network(s) or other types of ML models. The initial training may be performed in an offline stage. Additionally, and/or alternatively, the one or more ML models may be trained using batch learning.

The system 400 may include a server 420 which may be connected to or include the data store 422 which may function as a repository in which databases relating to training models, user history data, organization graph data and/or image transformation stylizers may be stored. Although shown as a single data store, the data store 422 may be representative of multiple storage devices and data stores which may be accessible by one or more of the image transformation engine 414, training mechanism 416, and application 412.

The client device 430 may be connected to the server 410 via a network 440. The network 440 may be a wired or wireless network(s) or a combination of wired and wireless networks that connect one or more elements of the system 400. The client device 430 may be a personal or handheld computing device having or being connected to input/output elements that enable a user to interact with various applications (e.g., application 412 or application 434) that enable the user to modify or use an image. Examples of suitable client devices 430 include but are not limited to personal computers, desktop computers, laptop computers, mobile telephones; smart phones; tablets; phablets; smart watches; wearable computers; gaming devices/computers; televisions; and the like. The internal hardware structure of a client device is discussed in greater detail with respect to FIGS. 7 and 8.

The client device 430 may include a local application 434. The application 434 may be a computer program executed on the client device that configures the device to be responsive to user input to enable the user to modify or use an image. Examples of suitable applications include, but are not limited to, a social media application, a designer application, a presentation application, a digital image editing application, and a word processing application.

In some examples, the application used to use or edit an image is executed on the server 410 (e.g., application 412) and provided via an online service. In some implementations, web applications communicate via the network 440 with a user agent 432, such as a browser, executing on the client device 430. The user agent 432 may provide a user interface that allows the user to interact with the application 412. User data from the application 434 or application 412 may be provided via the network 440 to the image transformation engine 414 for use in providing image transformation functionalities.

Figure 4B:
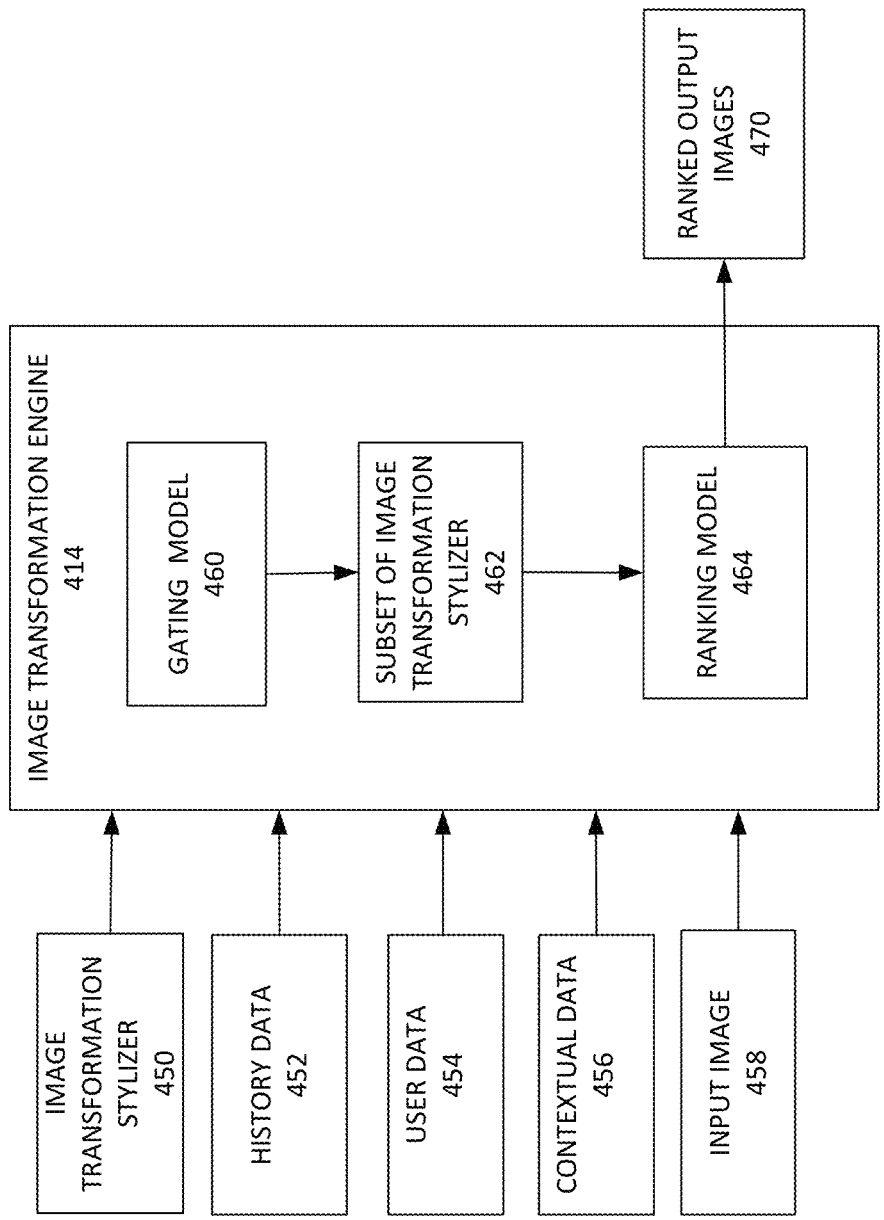

FIG. 4B depicts an example data flow between some of the elements of the example system 100. The image transformation engine 414 may include a gating model 460 and a ranking model 464. In some implementations, a request to transform an input is received by the image transformation engine 414 when a user submits a request via an application (e.g., applications 412/434) to edit an image (e.g., request to view image filters). In another example, the request is received, when the user is editing an image, inserting an image, or otherwise working with an image in a document or application. This may occur, when the application determines that the version of the image the user is working on can be improved to fit better with the rest of the document. Alternatively and/or additionally, it may automatically occur when the user inserts an image into a document (e.g., into a presentation slide) or begins editing an image in a document or application. In some implementations, the request may be submitted by an administrator of a visual asset library that desires to generate more images based on images that are currently available to them. The request may include the input image 458 and/or a link to a storage medium at which the input image 458 is stored.

Once the request to transform the input image 458 is received, the image transformation engine 414 may retrieve various data relating to the input image, the user, the application used for editing the image, and the like. The data may include history data 452, user data 454, and contextual data 456. History data may include data collected from the user submitting the request and/or other users. In an example, other users are grouped into users that are in some way similar to the user (e.g., have the same job title, work for the same company, have the same interests, etc.) and global users (e.g., all users that use a particular application to edit images and have consent to collection of their data). The history data may include data about which image transformation stylizers a user selected for particular types of images and/or in particular situations. For example, it may include data that shows users often select a grayscale image transformation stylizer for images containing natural landscapes. In another example, the history data may reveal that the user submitting the request often selects a warm image transformation filter for images containing human faces. This data may be collected from users that use various application to edit their images using image transformation stylizers. The images may be analyzed using ML models that analyze the content of an image to categorize the image (e.g., related to nature, headshot, pets, etc.) and the resulting determinations along with user's eventual selection of image transformation stylizers may be stored as history data for use by the image transformation engine 414.

User data 454 may include information about the user. For example, it may include data about the user's job title, projects they often work on, applications they use to work on their projects and user's geographical location (e.g., the country they are from), user's preferred language, and the like. Some of the user data 454 may be retrieved from organizational graph data which includes information about employees of an organization and their associations with one another. Contextual data may include data related to the type of application used to edit the image, the type of document in which the image is used (e.g., word document, presentation document, etc.), the device on which the image is being viewed (e.g., the device has a small screen or large screen), the time/date at which the image is being edited (e.g., if it is during the weekend, it is likely for personal use) and the intended purpose of the image (e.g., for social media applications, for use in a document, etc.).

In addition to the history data 452, user data 454, and contextual data 45, the image transformation engine 414 may also retrieve image transformation stylizers 450 and the input image 458. The image transformation stylizers 450 may include one or more image transformation stylizers that are available and offered for use by an image transformation service. The image transformation stylizers 450 may be stored in a data store containing a library of image transformation stylizers. In some implementations, to reduce processing burdens, the image transformation engine 414 does not retrieve the image transformation stylizers 450 themselves. Instead, the image transformation engine 414 may retrieve a list of the available image transformation stylizers 450. In an example, the list may include identifying information about each of the available image transformation stylizers (e.g., names of the stylizers and/or characteristics about each stylizer).

Once the required data is received, the image transformation engine 414 provides one or more of the data, image transformation stylizers 450 and input image 458 to the gating model 460. The gating model 460 may be an ML model that is trained to receive the data, examine the input image 458 and identify a subset of the image transformation stylizers 462 that are likely to be relevant to the user and/or input image 458. In other words, the gating model may eliminate one or more of the image transformation stylizers 450 that are not likely to be relevant or useful for transforming the input image 458. This may be done by examining one or more of the characteristics of the input image 458. The characteristics may include color, texture, tone, resolution, scale, contrast, and subject of the image (e.g., nature, human faces, pets, food, etc.). In an example examining and/or identifying the input characteristics may be done by a separate algorithm or ML model. For example, identifying the subject of the image may be done by an ML model that is trained on recognizing subjects of images.

After characteristics of the input image 458 have been identified and/or retrieved, the gating model may compare those characteristics with history data 452, user data 454 and contextual data 456 to determine which ones of the plurality of image transformation stylizers 450 are least likely to be used for transforming the input image 458. In this manner, the gating model can eliminate one or more image transformation stylizers from the image transformation stylizers 450 that will be used to provide a preview of transformed input image variants to the user. By eliminating image transformation stylizers that are not likely to be relevant to the input image and/or user, the image transformation engine 414 reduces memory, bandwidth and computer processing resources used for transforming the input image 458. Furthermore, the reduced image transformation stylizers are less likely to create confusion and cognitive overload for the user by only displaying those transformed variants are likely to be used by the user.

Once the gating model has identified the subset of image transformation stylizers 462, the input image 458 may be provided to the subset of image transformation stylizers 462 for transformation by those stylizers. Each of the subset of image transformation stylizers 462 may then process and transform the input image 458 in accordance with the characteristic of the image transformation stylizer. The resulting transformed variants of the input image and/or information (e.g., a list of) the transformed input image variants may then be provided to the ranking model 464. The ranking model may examine the transformed input image variants and compare those to history data, user data, contextual data and/or characteristics of the input image to rank the transformed input image variants in an order of relevance to the user and/or input image 458. This may be achieved by calculating a confidence score for each transformed input image variant. The confidence score may relate to the likelihood of the transformed input image variant being one that will be selected by the user. The resulting ranked output images 470 may then be provided by the image transformation engine 414 for display to the user. This may be achieved by providing the ranked output images 470 to the application for which the input image 458 was received. In an example, to reduce bandwidth and conserve screen space, a small version (e.g., thumbnail) of the ranked output images 470 is transmitted to the application. Once the user selects one of the ranked output images 470, then the full-size image may be transmitted to the application for use.

Figure 5A:
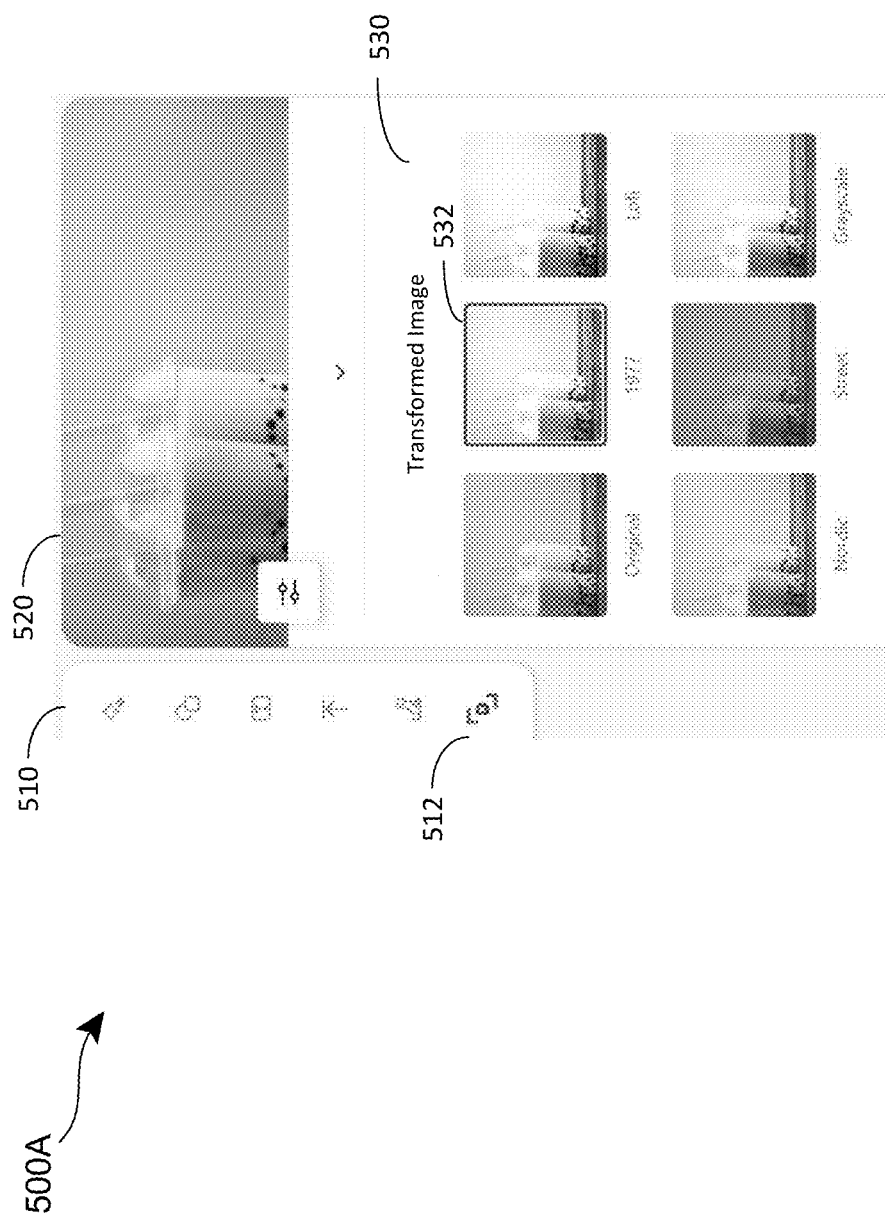
FIGS. 5A-5B depict example GUI screens of an application or service that provides image transformation services.
Figure 5B:
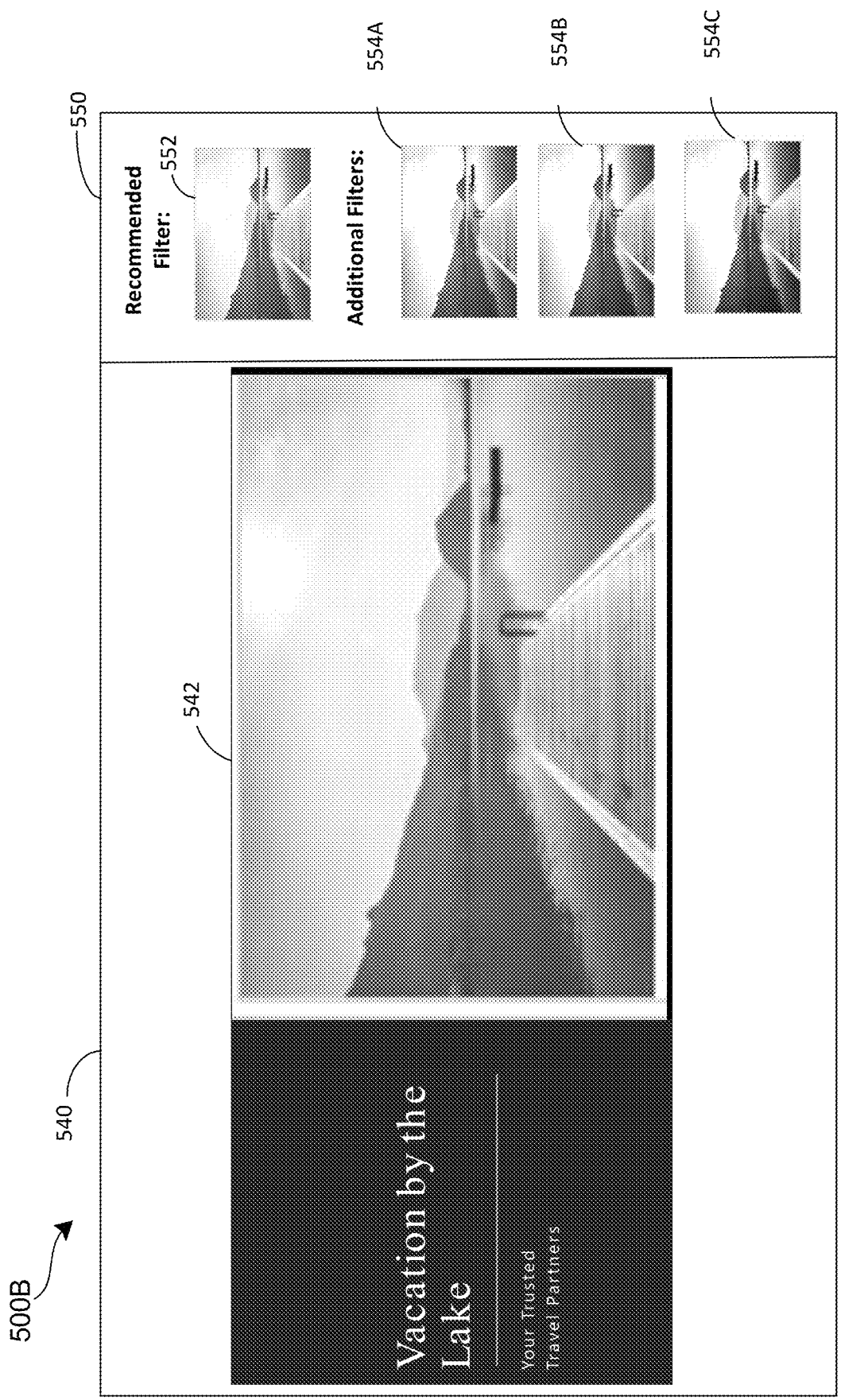

FIGS. 5A-5B depict example GUI screens of an application or service that provides image transformation services. FIG. 5A depicts an example GUI screen 500A of an image viewing/editing application. GUI screen 500A may be displayed by an image viewing/editing application when the user chooses to view and/or edit an image. The GUI screen 500A may include a toolbar menu 510 containing various menu options for performing a variety of tasks on an input image such as the image 520. The toolbar menu 510 may include an image transformation (e.g., filter) menu option 512 for automatically transforming the image 520. The image 520 may be displayed on a portion of the GUI screen 500A to enable the user to see the changes made on the image.

When the menu option 512 is selected, a portion of the GUI screen 500A may display a list of transformed image variants 530. As discussed above, the transformed image variants may be ranked and displayed based on their estimated relevance to the user and/or input image 520. In an example, when the number of transformed image variants 530 does not fit within the available portion of the GUI screen 500A, a UI element (e.g., scroll bar) may be provided for scrolling through the additional transformed image variants. In some implementations, a visual cue may be provided to indicate a recommendation for one or more transformed image variants that are highly likely to be selected by the user and/or highly likely to be relevant to the input image 520 and/or intended use of the input image 520. For example, transformed image variant 532 which was transformed by an image transformation stylizer named 1977 is marked by a colored outline to indicate that the transformed image variant 532 is recommended for use.

FIG. 5B depicts an example GUI screen 500B of a productivity application (e.g., presentation application such as Microsoft PowerPoint®) for creating/editing a document into which an image may be inserted. GUI screen 500B may be displayed by a productivity application when a new image is inserted, when an image in the document is selected (e.g., clicked on), and/or when the remaining content of the document is changed in a way that indicates changes to the one or more images in the document may be needed. The GUI screen 500A may include a content portion 540 which displays a current page or slide of the document.

The content portion 540 may include an image 542. When it is determined that transformations to the image 542 are desired or may be helpful, an image transformation pane 550 may be displayed. In some implementations, the image transformation pane 550 is displayed upon user request. For example, the application for which GUI screen 500B is displayed may include one or more menu options for invoking the image transformation pane 550. In other implementations, the application may determine that the image 542 does not fit well with the remaining content of the document and may automatically display the image transformation pane 550 to display one or more transformed variants of the image 542 for selection.

The image transformation pane 550 may display variations of image 542 that have been transformed by a selected number of image transformation stylizers. In an example, one of the transformed variants is selected as the most likely to fit well with the content of the content portion 540 or be selected by the user. For example, one of the transformed variants may be identified as being a top choice based on the current template of the content portion 540. This transformed variant 552 may be identified in the image transformation pane 550 as a recommended filter. The remaining transformed variants 554A-554C may be displayed in an order of their ranking, as determined by a ranking model.

Figure 6A:
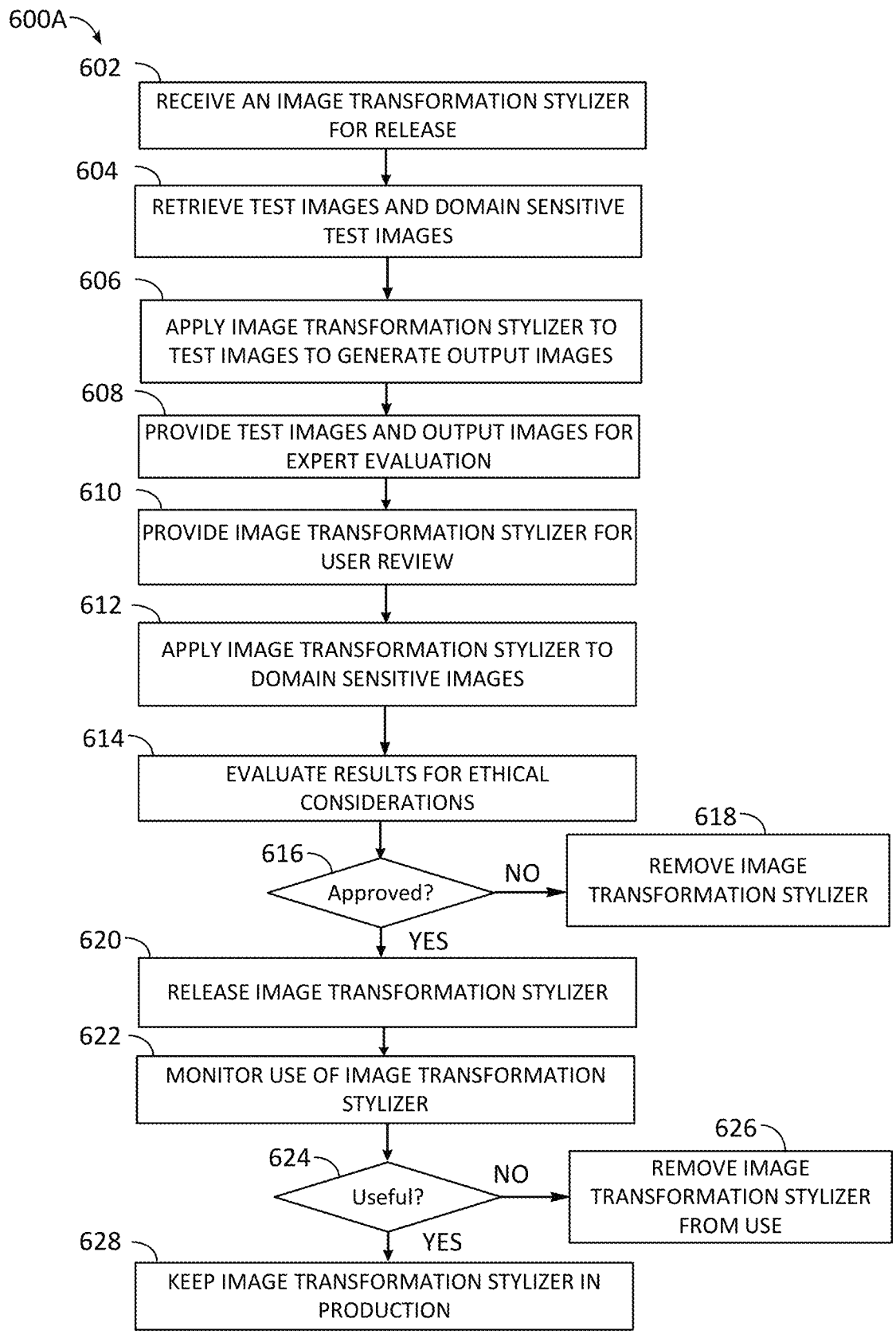
FIG. 6A is a flow diagram depicting an example method for dynamically producing and maintaining image transformation stylizers.

FIG. 6A is a flow diagram depicting an exemplary method 600A for dynamically producing and maintaining image transformation stylizers. One of more steps of the method 600A may be performed by an image transformation production and maintenance infrastructure such as the image transformation production and maintenance infrastructure 300 of FIG. 3. At 602, method 600A may begin by receiving a candidate image transformation stylizer for release. The candidate image transformation stylizer may be a newly created image transformation stylizer that is being evaluated for production. In some implementations, the candidate image transformation stylizer is an image transformation ML model.

Once the requested candidate image transformation stylizer is received, method 600A may proceed to retrieve a plurality of test images and/or domain sensitive test images, at 604 for use in testing and evaluation. The test images may be randomly selected or specifically generated test images that depict a variety of subjects. The domain sensitive test images may be test images that depict domain sensitive subjects/topics such as political topics. The retrieved test images may then be provided to the candidate images transformation stylizer data to generate output images, at 606. Once the output images are generated, they may be provided to one or more experts for evaluation, at 608. Expert evaluation may involve having one or more individuals who are experts in a given field (e.g., ML models, digital images, etc.) review the input test images, output images and/or the process of generating the output images to evaluate the quality, speed and/or effectiveness of the candidate image transformation stylizer.

In some implementations, if the expert evaluation determines that the candidate image transformation stylizer is not ready or appropriate for release, method 600A may end. In such an instant, the candidate image transformation stylizer may be returned back to the engineering team and/or ML model training stage for improvement. When the expert evaluation determines that the candidate image transformation stylizer is approved for production/release, method 600A may proceed to provide the candidate image transformation stylizer to a group of users for testing and evaluation, at 610. The users may utilize the candidate image transformation stylizer for a period of time to determine their usability, functionality, and the like. The evaluation process may involve users providing feedback regarding the candidate image transformation stylizer. The feedback may be explicit such as users filling out surveys, providing written comments, providing a rating, and the like. Furthermore, the feedback may be implicit. This may involve examining the user's use of the candidate image transformation stylizer to evaluate the number of times transformed image variants generated by the candidate image transformation stylizer are selected for use by users. The feedback may then be collected, reviewed and analyzed to determine if there are issues with the candidate image transformation stylizer that need to be addressed or whether the candidate image transformation stylizer is ready for release.

In some implementations, if the user evaluation stage results in determining that the candidate image transformation stylizer is not ready or appropriate for release, method 600A may end. The candidate image transformation stylizer may then be returned back to the engineering team and/or ML model training stage for improvement or it may be retired. When, however, the user evaluation process concludes that the candidate image transformation stylizer is ready for production/release, method 600A may proceed to provide the candidate image transformation stylizer for ethical testing and evaluation. This may involve applying the candidate image transformation stylizer to the domain sensitive test images to generate a plurality of domain sensitive output images, at 612. The domain sensitive test images and domain sensitive output images may then be reviewed and evaluated for ethical, cultural and/or other sensitive considerations, at 614. This may involve providing the domain sensitive test images and domain sensitive to one or more individuals who are experts in evaluating domain sensitive subjects and collecting their feedback regarding the candidate image transformation stylizer.

Once ethical evaluations have been completed, method 600A may proceed to determine, at 616, whether the candidate image transformation stylizer is approved for release. This may occur, when the candidate image transformation stylizer receives approval during the expert evaluation, user evaluation, and ethical evaluation stages. When it is determined that the candidate image transformation stylizer is not approved for release (no at 616), method 600A may proceed to remove the candidate image transformation stylizer from the process of production and release, at 618. In some implementations, this involves returning the candidate image transformation stylizer for further improvement.

When it is determined that the candidate image transformation stylizer is approved for release (yes at 616), method 600A may proceed to provide the candidate image transformation stylizer for release and production, at 620. This may involve adding the candidate image transformation stylizer to a list of available image transformation stylizers in an image transformation stylizer library. Once the candidate image transformation stylizer has been released, method 600A may monitor the use of the image transformation stylizer to determine its usefulness, functionality, and the like, at 622. This may be done by collecting data regarding the use of the image transformation stylizer. The collected data may be then analyzed to determine, at 624, whether the image transformation stylizer is useful and should continue to stay in production.

When it is determined that the image transformation stylizer is not useful to users (no at 624), method 600A may proceed to retire the image transformation stylizer, at 626. This may involve removing the image transformation stylizer from the library of available image transformation stylizers. If it is determined, however, that the image transformation stylizer is useful, method 600A may proceed to keep the image transformation stylizer in production, at 628.

Figure 6B:
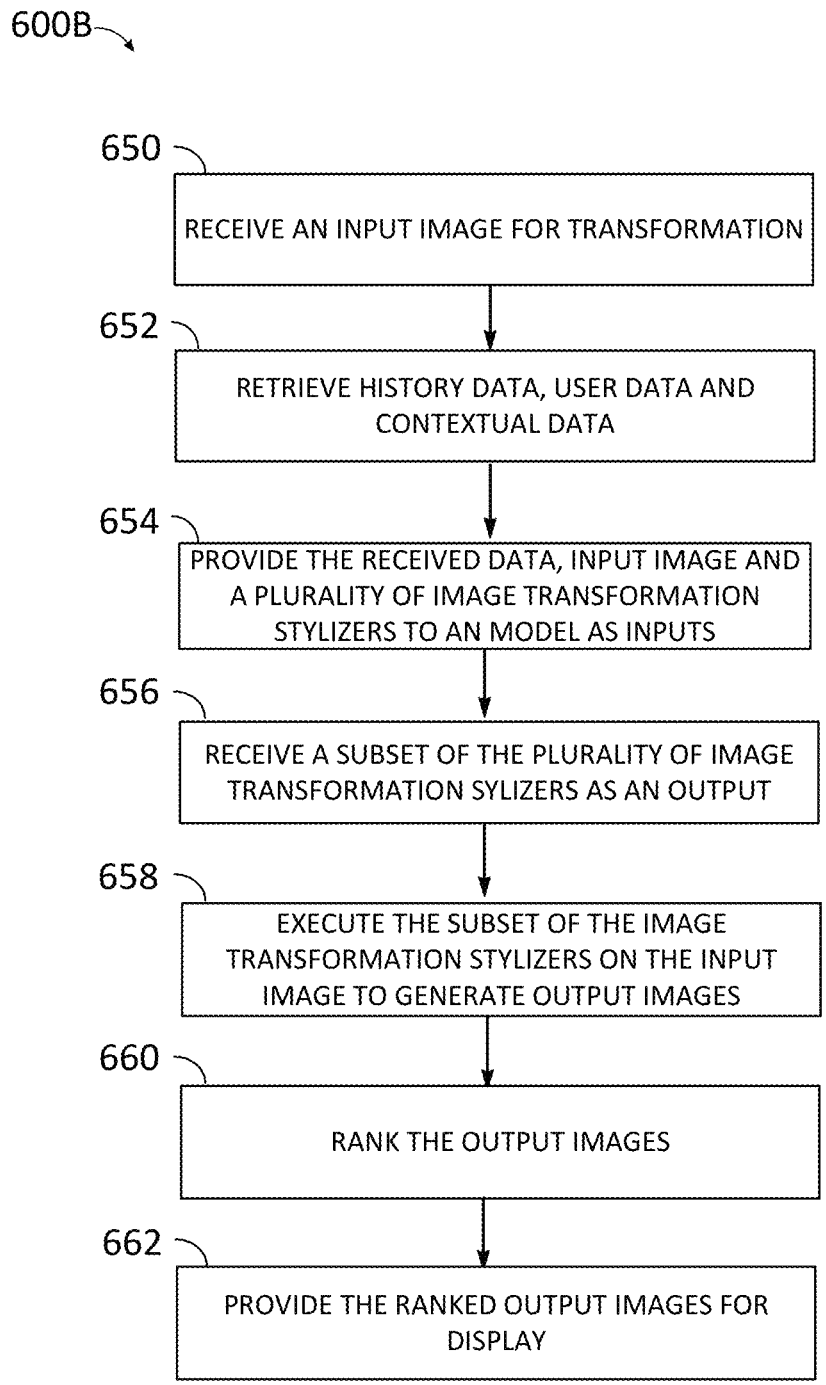
FIG. 6B is a flow diagram depicting an example method for selecting a set of image transformation models to generate transformed variants of an input image.

FIG. 6B is a flow diagram depicting an exemplary method 600B for selecting a set of image transformation models to generate transformed variants of an input image. One of more steps of the method 600B may be performed by an image transformation engine such as the image transformation engine 414 of FIGS. 4A-4B. At 650, method 600B may begin by receiving an input image for transformation. The input image may be received along with a request to generate one or more transformed variants of the input images. The request may be received from via an application utilized to edit the image or use the image in a document. The request may be submitted by a user, or it may be generated automatically by the application.

Upon receiving the input image, history data, user data and/or contextual data may be retrieved, at 652. The history data may be retrieved from a data store that stores historical data related to transformation of images by users via one or more image transformation stylizers. User data may be retrieved from user profile accounts, organization graph data, and the like. The contextual data may be retrieved from databases that store contextual data, from the document, the application, the user device, and the like.

Once the required data is retrieved, the retrieved data and input image along with information about a plurality of available image transformation stylizers may be submitted to an ML model as inputs, at 654. The ML model may be a gating model used to identify a subset from among the plurality of available image transformation stylizers that are more likely to be relevant and/or used for transforming the input image. The information about the plurality of available image transformation models may include the name of each available image transformation stylizer and/or one or more characteristics of each available image transformation stylizer. Once the ML model analyzes the input data, it may provide a selected subset of the available image transformation stylizers as an output, at 656.

Once the selected subset of the image transformation stylizers is received, method 600B may proceed to execute each of the image transformation stylizers in the subset to the input image to generate a plurality of transformed output images, at 658. The transformed output images may then be ranked, at 660. The ranking may be performed by a ranking ML model that takes as input the subset of image transformation stylizers, the input image, and/or history data, user data or contextual data to rank the image transformation stylizers based on their likely relevance to the user and/or input image. The ranked output images may then be provided for display, at 662. This may be done by transmitting the ranked output images to the application from which the request was received for display.

Figure 7:
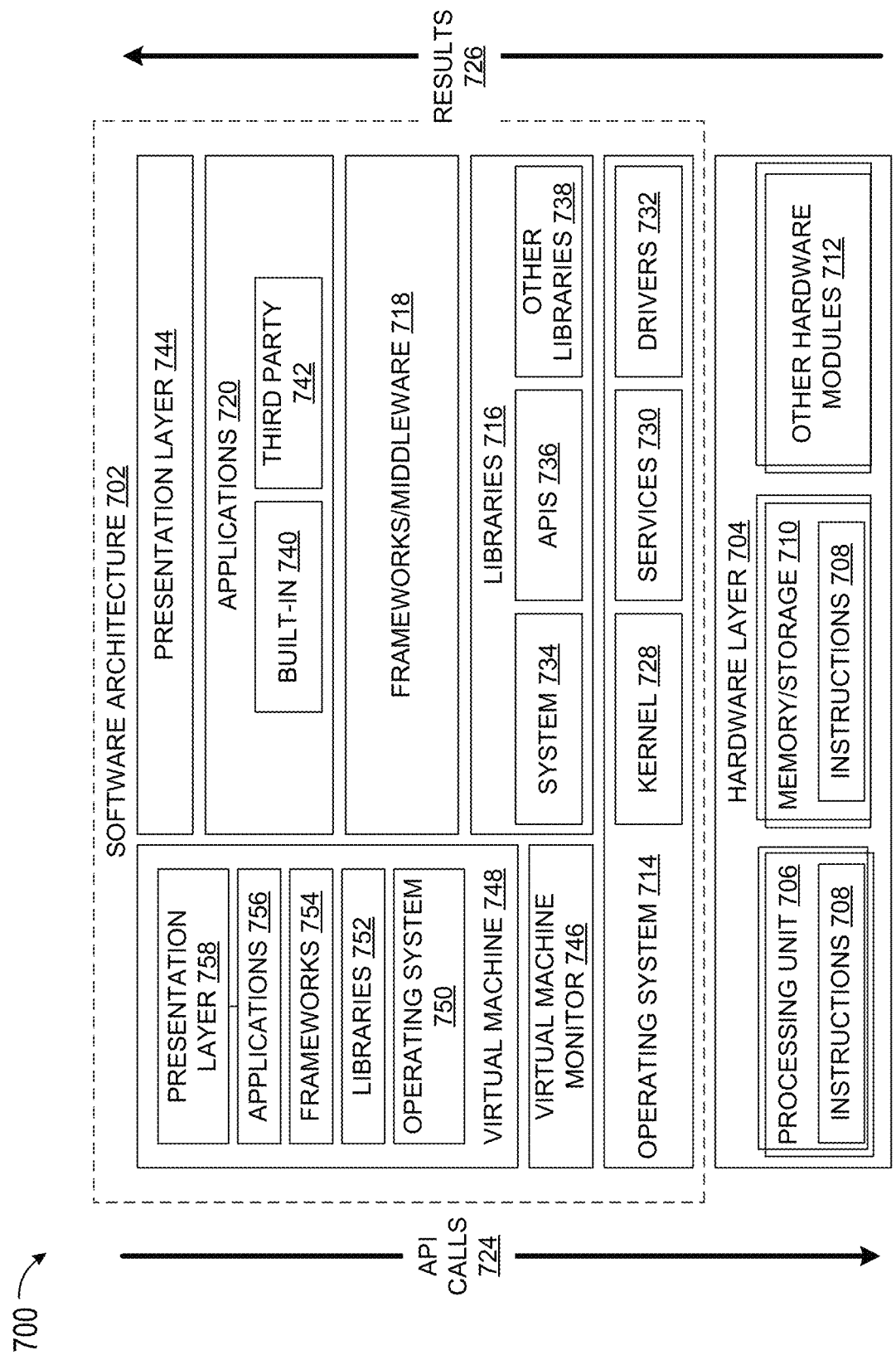
FIG. 7 is a block diagram illustrating an example software architecture, various portions of which may be used in conjunction with various hardware architectures herein described.

FIG. 7 is a block diagram 700 illustrating an example software architecture 702, various portions of which may be used in conjunction with various hardware architectures herein described, which may implement any of the above-described features. FIG. 7 is a non-limiting example of a software architecture and it will be appreciated that many other architectures may be implemented to facilitate the functionality described herein. The software architecture 702 may execute on hardware such as client devices, native application provider, web servers, server clusters, external services, and other servers. A representative hardware layer 704 includes a processing unit 706 and associated executable instructions 708. The executable instructions 708 represent executable instructions of the software architecture 702, including implementation of the methods, modules and so forth described herein.

The hardware layer 704 also includes a memory/storage 710, which also includes the executable instructions 708 and accompanying data. The hardware layer 704 may also include other hardware modules 712. Instructions 708 held by processing unit 706 may be portions of instructions 708 held by the memory/storage 710.

The example software architecture 702 may be conceptualized as layers, each providing various functionality. For example, the software architecture 702 may include layers and components such as an operating system (OS) 714, libraries 716, frameworks 718, applications 720, and a presentation layer 744. Operationally, the applications 720 and/or other components within the layers may invoke API calls 724 to other layers and receive corresponding results 726. The layers illustrated are representative in nature and other software architectures may include additional or different layers. For example, some mobile or special purpose operating systems may not provide the frameworks/middleware 718.

The OS 714 may manage hardware resources and provide common services. The OS 714 may include, for example, a kernel 728, services 730, and drivers 732. The kernel 728 may act as an abstraction layer between the hardware layer 704 and other software layers. For example, the kernel 728 may be responsible for memory management, processor management (for example, scheduling), component management, networking, security settings, and so on. The services 730 may provide other common services for the other software layers. The drivers 732 may be responsible for controlling or interfacing with the underlying hardware layer 704. For instance, the drivers 732 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 716 may provide a common infrastructure that may be used by the applications 720 and/or other components and/or layers. The libraries 716 typically provide functionality for use by other software modules to perform tasks, rather than rather than interacting directly with the OS 714. The libraries 716 may include system libraries 734 (for example, C standard library) that may provide functions such as memory allocation, string manipulation, file operations. In addition, the libraries 716 may include API libraries 736 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 716 may also include a wide variety of other libraries 738 to provide many functions for applications 720 and other software modules.

The frameworks 718 (also sometimes referred to as middleware) provide a higher-level common infrastructure that may be used by the applications 720 and/or other software modules. For example, the frameworks 718 may provide various graphic user interface (GUI) functions, high-level resource management, or high-level location services. The frameworks 718 may provide a broad spectrum of other APIs for applications 720 and/or other software modules.

The applications 720 include built-in applications 740 and/or third-party applications 742. Examples of built-in applications 740 may include, but are not limited to, a contacts application, a browser application, a location application, a media application, a messaging application, and/or a game application. Third-party applications 742 may include any applications developed by an entity other than the vendor of the particular system. The applications 720 may use functions available via OS 714, libraries 716, frameworks 718, and presentation layer 744 to create user interfaces to interact with users.

Some software architectures use virtual machines, as illustrated by a virtual machine 748. The virtual machine 748 provides an execution environment where applications/modules can execute as if they were executing on a hardware machine (such as the machine depicted in block diagram 800 of FIG. 8, for example). The virtual machine 748 may be hosted by a host OS (for example, OS 714) or hypervisor, and may have a virtual machine monitor 746 which manages operation of the virtual machine 748 and interoperation with the host operating system. A software architecture, which may be different from software architecture 702 outside of the virtual machine, executes within the virtual machine 748 such as an OS 750, libraries 752, frameworks 754, applications 756, and/or a presentation layer 758.

Figure 8:
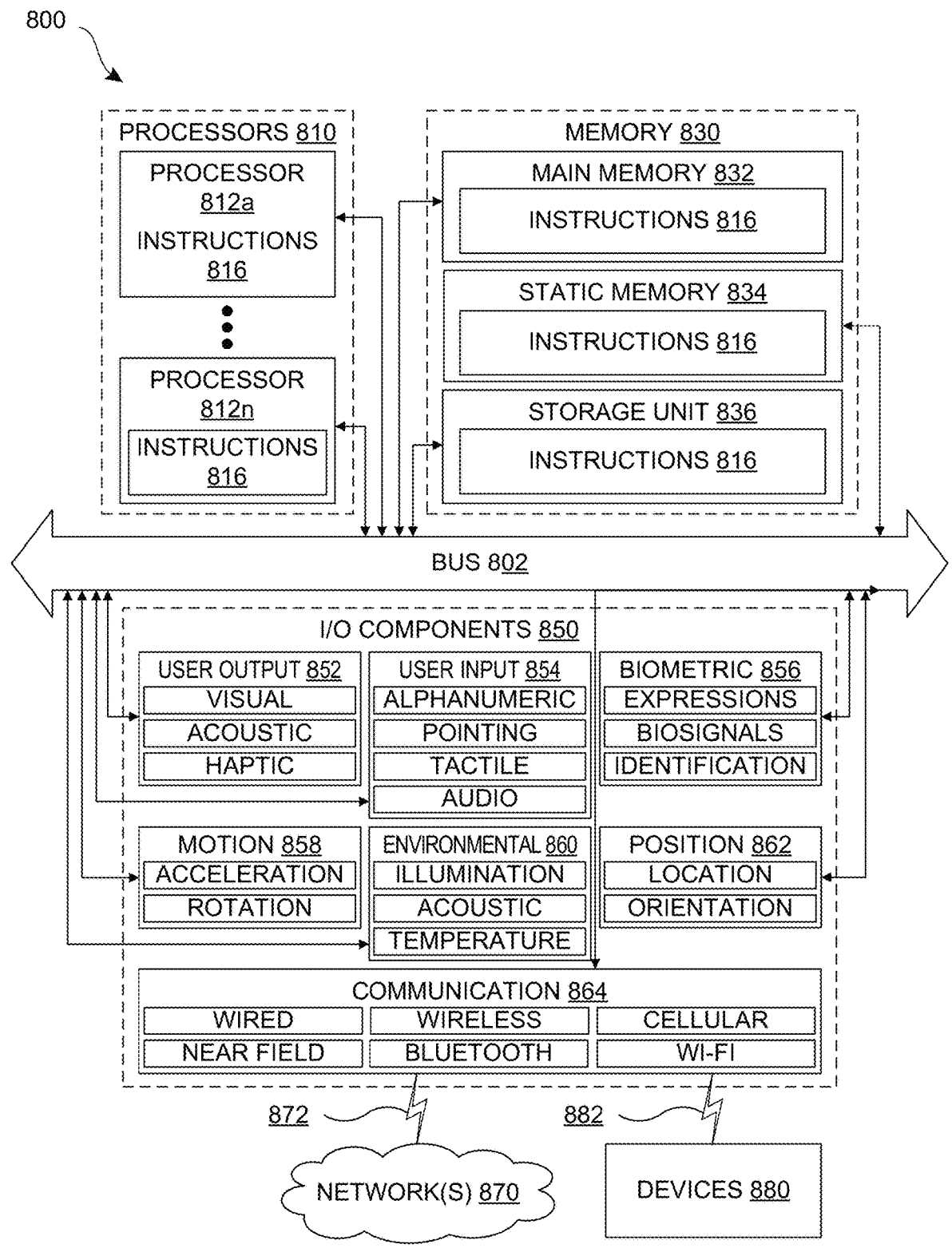
FIG. 8 is a block diagram illustrating components of an example machine configured to read instructions from a machine-readable medium and perform any of the features described herein.

FIG. 8 is a block diagram illustrating components of an example machine 800 configured to read instructions from a machine-readable medium (for example, a machine-readable storage medium) and perform any of the features described herein. The example machine 800 is in a form of a computer system, within which instructions 816 (for example, in the form of software components) for causing the machine 800 to perform any of the features described herein may be executed. As such, the instructions 816 may be used to implement methods or components described herein. The instructions 816 cause unprogrammed and/or unconfigured machine 800 to operate as a particular machine configured to carry out the described features. The machine 800 may be configured to operate as a standalone device or may be coupled (for example, networked) to other machines. In a networked deployment, the machine 800 may operate in the capacity of a server machine or a client machine in a server-client network environment, or as a node in a peer-to-peer or distributed network environment. Machine 800 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 800 is illustrated, the term "machine" includes a collection of machines that individually or jointly execute the instructions 816.

The machine 800 may include processors 810, memory 830, and I/O components 850, which may be communicatively coupled via, for example, a bus 802. The bus 802 may include multiple buses coupling various elements of machine 800 via various bus technologies and protocols. In an example, the processors 810 (including, for example, a central processing unit (CPU), a graphics processing unit (GPU), a digital signal processor (DSP), an ASIC, or a suitable combination thereof) may include one or more processors 812a to 812n that may execute the instructions 816 and process data. In some examples, one or more processors 810 may execute instructions provided or identified by one or more other processors 810. The term "processor" includes a multi-core processor including cores that may execute instructions contemporaneously. Although FIG. 8 shows multiple processors, the machine 800 may include a single processor with a single core, a single processor with multiple cores (for example, a multi-core processor), multiple processors each with a single core, multiple processors each with multiple cores, or any combination thereof. In some examples, the machine 800 may include multiple processors distributed among multiple machines.

The memory/storage 830 may include a main memory 832, a static memory 834, or other memory, and a storage unit 836, both accessible to the processors 810 such as via the bus 802. The storage unit 836 and memory 832, 834 store instructions 816 embodying any one or more of the functions described herein. The memory/storage 830 may also store temporary, intermediate, and/or long-term data for processors 810. The instructions 816 may also reside, completely or partially, within the memory 832, 834, within the storage unit 836, within at least one of the processors 810 (for example, within a command buffer or cache memory), within memory at least one of I/O components 850, or any suitable combination thereof, during execution thereof. Accordingly, the memory 832, 834, the storage unit 836, memory in processors 810, and memory in I/O components 850 are examples of machine-readable media.

As used herein, "machine-readable medium" refers to a device able to temporarily or permanently store instructions and data that cause machine 800 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 816) for execution by a machine 800 such that the instructions, when executed by one or more processors 810 of the machine 800, cause the machine 800 to perform and one or more of the features described herein. Accordingly, a "machine-readable medium" may refer to a single storage device, as well as "cloud-based" storage systems or storage networks that include multiple storage apparatus or devices.

The I/O components 850 may include a wide variety of hardware components adapted to receive input, provide output, produce output, transmit information, exchange information, capture measurements, and so on. The specific I/O components 850 included in a particular machine will depend on the type and/or function of the machine. For example, mobile devices such as mobile phones may include a touch input device, whereas a headless server or IoT device may not include such a touch input device. The particular examples of I/O components illustrated in FIG. 8 are in no way limiting, and other types of components may be included in machine 800. The grouping of I/O components 850 are merely for simplifying this discussion, and the grouping is in no way limiting. In various examples, the I/O components 850 may include user output components 852 and user input components 854. User output components 852 may include, for example, display components for displaying information (for example, a liquid crystal display (LCD) or a projector), acoustic components (for example, speakers), haptic components (for example, a vibratory motor or force-feedback device), and/or other signal generators. User input components 854 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 850 may include biometric components 856, motion components 858, environmental components 860 and/or position components 862, among a wide array of other environmental sensor components. The biometric components 856 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 862 may include, for example, location sensors (for example, a Global Position System (GPS) receiver), altitude sensors (for example, an air pressure sensor from which altitude may be derived), and/or orientation sensors (for example, magnetometers). The motion components 858 may include, for example, motion sensors such as acceleration and rotation sensors. The environmental components 860 may include, for example, illumination sensors, acoustic sensors and/or temperature sensors.

The I/O components 850 may include communication components 864, implementing a wide variety of technologies operable to couple the machine 800 to network(s) 870 and/or device(s) 880 via respective communicative couplings 872 and 882. The communication components 864 may include one or more network interface components or other suitable devices to interface with the network(s) 870. The communication components 864 may include, for example, components adapted to provide wired communication, wireless communication, cellular communication, Near Field Communication (NFC), Bluetooth communication, Wi-Fi, and/or communication via other modalities. The device(s) 880 may include other machines or various peripheral devices (for example, coupled via USB).

In some examples, the communication components 864 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 862, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-5) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

In the following, further features, characteristics and advantages of the invention will be described by means of items:

Item 1. A data processing system comprising:
 a processor; and
 a memory in communication with the processor, the memory comprising executable instructions that, when executed by, the processor, cause the data processing system to perform functions of:
  receiving an input image for transformation by a plurality of image transformation stylizers;
  providing the input image, information about the plurality of image transformation stylizers and at least one of user data, history data, and contextual data to a trained machine-learning (ML) model for selecting a subset of the plurality of image transformation stylizers based on at least on one of the input image, the information about the plurality of image transformation stylizers, the user data, the history data, and the contextual data;
  receiving as an output from the ML model the subset of image transformation stylizers;
  executing the subset of the image transformation stylizers on the input image to generate a plurality of transformed output images;
  ranking the plurality of transformed output images based on at least one of the input image, the user data, the history data, and the contextual data; and
  providing the ranked plurality of transformed output images for display.

Item 2. The data processing system of item 1, wherein the ML model is a gating model that is configured to select the subset of image transformation stylizers based on their likelihood of being selected to transform the input image.

Item 3. The data processing system of any of items 1 or 2, wherein ranking the plurality of transformed output images is done via a ranking ML model that receives as input the input image, the plurality of transformed output images, information about the subset of the plurality of image transformation stylizers and at least one of user data, history data, and contextual data and provides as output the ranked plurality of transformed output images.

Item 4. The data processing system of any preceding item, wherein the contextual data includes at least one of a type of application in which the input image is used or edited, a type of document in which the input image is used, an intended use for the input image, and a type of device on which the input image is being displayed.

Item 5. The data processing system of any preceding item, wherein the instructions further cause the processor to cause the data processing system to perform functions of:
 selecting one of the plurality of transformed output images as a recommended transformed output image; and
 providing display data to notify a user of the recommendation.

Item 6. The data processing system of any preceding item, wherein at least one of the plurality of image transformation stylizers is an image transformation ML model.

Item 7. The data processing system of any preceding item, wherein the instructions further cause the processor to cause the data processing system to perform functions of displaying the ranked transformed output images in a user interface element that enables the user to select one of the ranked transformed output images.

Item 8. A method for transforming an input image via a plurality of image transformation stylizers, comprising:
 receiving the input image for transformation by the plurality of image transformation stylizers;
 providing the input image, information about the plurality of image transformation stylizers and at least one of user data, history data, and contextual data to a trained machine-learning (ML) model for selecting a subset of the plurality of image transformation stylizers based on at least on one of the input image, the information about the plurality of image transformation stylizers, the user data, the history data, and the contextual data;
 receiving as an output from the ML model the subset of image transformation stylizers;
 executing the subset of the image transformation stylizers on the input image to generate a plurality of transformed output images;
 ranking the plurality of transformed output images based on at least one of the input image, the user data, the history data, and the contextual data; and
 providing the ranked plurality of transformed output images for display.

Item 9. The method of item 8, wherein the ML model is a gating model that is configured to select the subset of image transformation stylizers based on their likelihood of being selected to transform the input image.

Item 10. The method of any of items 8 or 9, wherein ranking the plurality of transformed output images is done via a ranking ML model that receives as input the input image, the plurality of transformed output images, information about the subset of the plurality of image transformation stylizers and at least one of user data, history data, and contextual data and provides as output the ranked plurality of transformed output images.

Item 11. The method of any of items 8-10, wherein the contextual data includes at least one of a type of application in which the input image is used or edited, a type of document in which the input image is used, an intended use for the input image, and a type of device on which the input image is being displayed.

Item 12. The method of any of items 8-11, further comprising:
 selecting one of the plurality of transformed output images as a recommended transformed output image; and
 providing display data to notify a user of the recommendation.

Item 13. The method of any of items 8-12, wherein at least one of the plurality of image transformation stylizers is an image transformation ML model.

Item 14. The method of any of items 8-13, further comprising displaying the ranked transformed output images in a user interface element that enables the user to select one of the ranked transformed output images.

Item 15. A method for releasing and maintaining an image transformation stylizer, comprising:
receiving the image transformation stylizer for release;
retrieving a plurality of domain sensitive input images;
applying the image transformation stylizer to the plurality of domain sensitive input images to generate a plurality of transformed output images;
receiving evaluation data related to the transformed output images;
determining based on the evaluation data that the image transformation stylizer is approved for release;
releasing the image transformation stylizer for use by an image transformation engine;
collecting data relating to use of the image transformation stylizer;
determining, based on the collected data, that the image transformation stylizer should be retired; and
removing the image transformation stylizer from use by the image transformation engine.

Item 16. The method of item 15, wherein the transformed output images are evaluated for compliance with at least one of ethical or cultural standards.

Item 17. The method of any of items 15 or 16, where data relating to the user of the image transformation stylizer includes data on frequency of use of the image transformation stylizer by users.

Item 18. The method of any of items 15-17, data relating to the user of the image transformation stylizer includes feedback data provided by users for the image transformation stylizer.

Item 19. The method of item 18, wherein releasing the image transformation stylizer for use by an image transformation engine includes adding the image transformation stylizer to a library of image transformation stylizers.

Item 20. The method of any of items 15-19, further comprising:
receiving feedback data from users about the image transformation stylizer, and determining based on the evaluation data and the feedback whether the image transformation stylizer is approved for release.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
a processor; and
a memory in communication with the processor, the memory comprising executable instructions that, when executed by, the processor, cause the data processing system to perform functions of:
receiving an input image for transformation by a plurality of image transformation stylizers;
providing the input image, information about the plurality of image transformation stylizers and at least one of user data, history data, and contextual data to a trained machine-learning (ML) model for selecting a subset of the plurality of image transformation stylizers based on at least on one of the input image, the information about the plurality of image transformation stylizers, the user data, the history data, and the contextual data;
receiving as an output from the ML model the subset of image transformation stylizers;
executing the subset of the image transformation stylizers on the input image to generate a plurality of transformed output images;

ranking the plurality of transformed output images based on at least one of the input image, the user data, the history data, and the contextual data; and providing the ranked plurality of transformed output images for display, wherein ranking the plurality of transformed output images is done via a ranking ML model that receives as input the input image, the plurality of transformed output images, information about the subset of the plurality of image transformation stylizers and at least one of user data, history data, and contextual data and provides as output the ranked plurality of transformed output images.

2. The data processing system of claim 1, wherein the ML model is a gating model that is configured to select the subset of image transformation stylizers based on their likelihood of being selected to transform the input image.

3. The data processing system of claim 1, wherein the contextual data includes at least one of a type of application in which the input image is used or edited, a type of document in which the input image is used, an intended use for the input image, and a type of device on which the input image is being displayed.

4. The data processing system of claim 1, wherein the instructions further cause the processor to cause the data processing system to perform functions of:

selecting one of the plurality of transformed output images as a recommended transformed output image; and providing display data to notify a user of the recommendation.

5. The data processing system of claim 1, wherein at least one of the plurality of image transformation stylizers is an image transformation ML model.

6. The data processing system of claim 1, wherein the instructions further cause the processor to cause the data processing system to perform functions of displaying the ranked transformed output images in a user interface element that enables the user to select one of the ranked transformed output images.

7. A method for transforming an input image via a plurality of image transformation stylizers, comprising:

receiving the input image for transformation by the plurality of image transformation stylizers;

providing the input image, information about the plurality of image transformation stylizers and at least one of user data, history data, and contextual data to a trained machine-learning (ML) model for selecting a subset of the plurality of image transformation stylizers based on at least on one of the input image, the information about the plurality of image transformation stylizers, the user data, the history data, and the contextual data;

receiving as an output from the ML model the subset of image transformation stylizers;

executing the subset of the image transformation stylizers on the input image to generate a plurality of transformed output images;

ranking the plurality of transformed output images based on at least one of the input image, the user data, the history data, and the contextual data; and providing the ranked plurality of transformed output images for display wherein ranking the plurality of transformed output images is done via a ranking ML model that receives as input the input image, the plurality of transformed output images, information about the subset of the plurality of image transformation stylizers and at least one of user data, history data, and contextual data and provides as output the ranked plurality of transformed output images.

8. The method of claim 7, wherein the ML model is a gating model that is configured to select the subset of image transformation stylizers based on their likelihood of being selected to transform the input image.

9. The method of claim 7, wherein the contextual data includes at least one of a type of application in which the input image is used or edited, a type of document in which the input image is used, an intended use for the input image, and a type of device on which the input image is being displayed.

10. The method of claim 7, further comprising:

selecting one of the plurality of transformed output images as a recommended transformed output image; and providing display data to notify a user of the recommendation.

11. The method of claim 7, wherein at least one of the plurality of image transformation stylizers is an image transformation ML model.

12. The method of claim 7, further comprising displaying the ranked transformed output images in a user interface element that enables the user to select one of the ranked transformed output images.

* * * * *